May 13, 1941.  F. J. KENNEDY  2,241,783
FLOOR DUCT
Filed Feb. 19, 1940
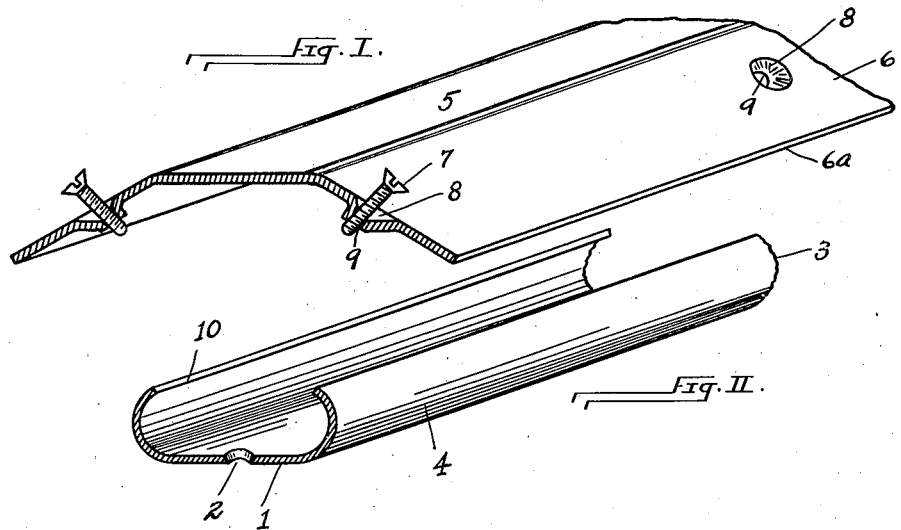
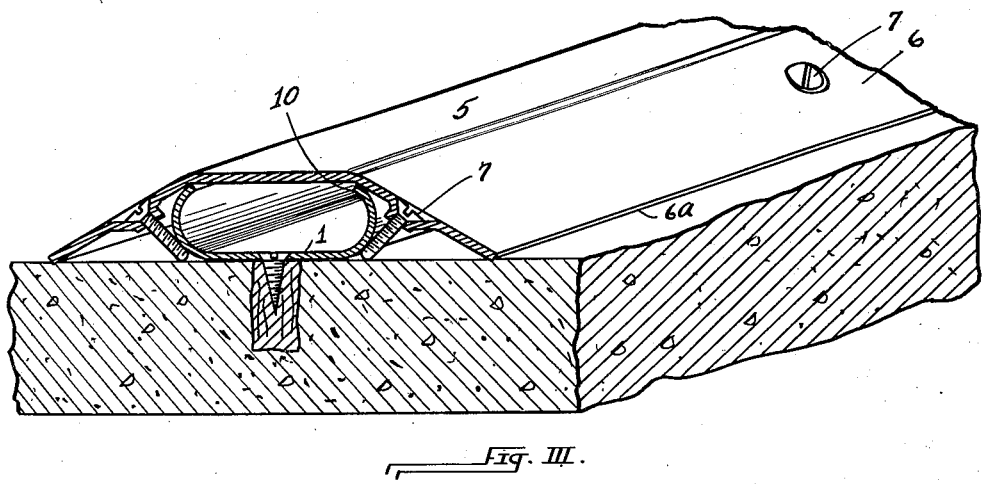
INVENTOR
Frank J. Kennedy
by Christy and Wharton
his attorneys Patented May 13, 1941

2,241,783

UNITED STATES PATENT OFFICE 2,241,783

FLOOR DUCT

Frank J. Kennedy, Brooklyn, N. Y., assignor to National Electric Products Corporation, a corporation of Delaware Application February 19, 1940, Serial No. 319,598

2 Claims. (Cl. 189—35)

This invention relates to a floor duct for the housing of electrical wiring at the surface of a building floor.

The best forms of floor duct for that purpose consist primarily of two elements: One being a channel element which is directly attached to the floor, upwardly to present its open side; and the other of which elements is a housing formed as a ramp with two sides divergently inclining from a centrally disposed upper wall. Such structures should be so organized that they extend a limited vertical distance from the floor surface, and so organized that the housing element tends to lie dead on the floor in contact with it to both sides of the channel. It is desirable that the housing element be of relatively rigid structure in order that it may so lie, and it is also desirable that the channel element be relatively flexible and resilient, that it may conform to slight irregularities in the floor surface, and in order to improve the engagement of the housing element with it.

A highly desirable floor duct assembly is disclosed in United States Patent No. 2,134,393, granted October 25, 1938, to Inslee A. Bennett.

The object of my invention is to provide a floor duct purposed to meet certain conditions of use, such as those in which the irregularity in the surface of the floor upon which the duct is laid, is relatively marked. Under such conditions, the channel element of the duct, being flexible and resilient, tends to conform to the surface irregularity of the floor, itself assuming a somewhat wavy condition. I have discovered that, under such conditions, I may engage the housing element of the duct to the channel element in spite of the irregularity of the latter, by mounting in the side walls of the housing element locking fingers which have a regulable convergently downward and inward extension, so that they will engage the housing to the channel in spite of irregularity in the position of the latter. In the preferred embodiment of my invention, the locking fingers, by slight regional deformation of the resilient channel element, tend positively to engage the housing thereto and to draw down and tighten the housing on the channel.

In the accompanying drawing which illustrates an embodiment of my invention, Fig. I is an isometric view showing the housing element of the duct with my novel channel-engaging means carried thereby. Fig. II is an isometric view of the channel element of the duct shown in juxtaposition to the housing element of Fig. I. Fig. III is an isometric view of the duct assembly, showing the duct elements in assembled condition and attached by screw-receiving plugs and screws to a concrete floor, the floor and plugs being shown in vertical section.

The channel element of the duct is a desirably unitary structure, consisting of a relatively flat floor-contacting base 1 having therein openings 2 for its attachment by screws, nails, or the like, to an underlying floor structure. The side walls 3 of the channel are upstandingly arranged along the side edges of the base 1, to project outwardly as well as upwardly therefrom. For structural simplicity it is desirable that the side walls 3 as shown have their outward projection provided by curvature of the walls so that they form lateral bulges 4 above the junction line between the side walls and the base. It is desirable, as above noted, that the channel element possess in measured order flexibility, in order that it may conform to a wavy contour of the floor surface, and some resiliency for perfection in the engagement of the housing element to it.

The housing element of the assembly comprises primarily a top wall 5 and side walls 6 which decline divergently from the plane of the top wall through equal distances and at equal angles of declination, in installation to space the top wall 5 from the surface of a floor upon which the edges of the side wall 6 may rest. Because of its general contour, the housing element thus presents a ramp-like exterior conformation longitudinally along both its sides, and is thus adapted to lie in exposed position on a floor, or under a floor covering, with minimized obstruction presented above the floor surface. The edges 6a of the housing side walls are as shown sharp, so that they present to the floor surface a line, or knife, contact which tends to cause the housing to lie straight and dead along the floor, and tends to permit its edges to bite into slight surface irregularities in a floor surface.

My novel means for engaging the housing element of the duct to the channel element thereof, consists, as illustrated, of screws 7, which are threaded for inward projection in bores 8 at the inward and downward terminal of sockets 9 countersunk in the divergent side walls 6 of the housing. The sockets and bores in which the screws are mounted are formed to direct the screws along convergent lines which in their inward extension will bring them terminally beneath the bulges 4 of the channel side walls to serve as locking fingers engaging the housing to the channel. Desirably their position is such that their movement along the side walls tends regionally to deform the walls. In the specific form of housing element shown in the drawings the angle of declination of the side walls is such that it is desirable slightly to skew the locking fingers with respect to the plane of the side walls rather than to mount them directly at right angles thereto.

In assembly of the duct, of which assembly Fig. III may be taken as exemplary, the screws 7, serving as locking fingers, extend convergently downward and inward from the divergent side walls of the housing with the distal regions of their shanks in contact with, and extended beneath, the outward projections provided by the outward bulges 4 of the side walls, and thus serve to engage the housing to the channel against removal therefrom. It will be understood that if there be a relatively great length of channel and a relatively great length of housing, with the channel projectant a variable distance from a definite horizontal plane, the relatively rigid housing can nonetheless be attached to it by extending the screws 7 convergently inward and downward a distance appropriate to the position of the channel in each particular region along its length. Advantage is thus presented over an engaging structure which requires a truer supporting structure for the channel in order that the relatively rigid housing may firmly be engaged to it.

The channel element of the duct having a slight desirable resiliency, and the locking fingers 7 being in compressive relation to the side walls 3 of the channel at the outward projections 4 thereof, there is a tendency for them, as they are moved convergently downwardly and inwardly in the assembly, by a wedging effect to draw the housing element tightly to the channel. In such action there is a tendency for the housing slightly to deflect the inwardly curved inner edges 10 of the channel side walls, thus creating a resilient opposition tending to tighten the engagement of the housing to the channel. This forms a duct which is firmly integrated in spite of deficiency in the regularity of the floor surface on which it is laid, and one which tends in measure to compensate for such irregularity.

Duct of this sort, equipped with my novel structure for interengaging the housing element and channel element of the duct, may be with advantage used upon floors of wood, or other readily workable material. It is of particular advantage upon concrete floors which cannot readily, by planing or otherwise, be made level in the region in which the duct is to lie.

Throughout the specification and claims, outward projection of the channel side walls is stated as providing structure beneath which the locking fingers may engage. As shown, this outward projection is provided by an outward bulging of the side walls above their junction line with the base of the channel. If desired, however, projection may be provided by utilizing straight walls upstanding from the base, and forming beads or bosses upon such side walls; or by forming in the side walls indentations, into which the locking fingers may be extended. The wall structure overlying such indentations thus forms projections within the spirit of my invention and the statement of the appended claims. Numerous other modifications in the form and arrangement of the illustrated embodiment may be made without departing from the spirit of my invention.

I claim as my invention:

1. In an electrical duct adapted to rest on the surface of a floor comprising a channel element formed as a substantially flat base adapted for mounting on a floor surface and upstanding side walls formed to project outwardly above their junction lines with the base, and a housing element having two divergently declining side walls arranged in assembly of the housing with the channel to lie with its terminal edges laterally beyond the channel and out of direct contact therewith; the herein described novel engagement between the channel and the housing consisting essentially of locking fingers mounted in the divergent side walls of the housing and arranged for extension convergently downward and inward from their mounting in the divergent side walls of the housing a regulable distance toward the channel side walls by a position terminally beneath the outward projections thereof to engage the housing to the channel.

2. In an electrical duct adapted to rest on the surface of a floor comprising a channel element formed as a substantially flat base adapted for mounting on a floor surface and upstanding side walls formed to project outwardly above their junction lines with the base, and a housing element having two divergently declining side walls arranged in assembly of the housing with the channel to lie with its terminal edges laterally beyond the channel and out of direct contact therewith, the said channel element being relatively resilient with respect to the said housing element; the herein described novel engagement between the channel and the housing consisting essentially of locking fingers mounted in the divergent side walls of the housing and arranged for extension convergently downward and inward from their mounting in the said divergent side walls of the housing a regulable distance toward and downwardly along the channel side walls by engagement at the outward projections thereof to engage the housing to the channel and by slight wedging deformation of the channel side walls closely and firmly to engage the housing to the channel.

FRANK J. KENNEDY.